Jan. 30, 1940.  O. C. MALSCH  2,188,415

DENTAL FLASK

Filed Nov. 10, 1938

INVENTOR:-
Otto C. Malsch
BY Paul Purchard
ATTORNEY

Patented Jan. 30, 1940

2,188,415

UNITED STATES PATENT OFFICE 2,188,415

DENTAL FLASK

Otto C. Malsch, Pittsburgh, Pa.

Application November 10, 1938, Serial No. 239,829

2 Claims. (Cl. 18—33)

This invention relates to dental flasks and more in particular to flasks of the sectional type used for holding and vulcanizing or otherwise securing artificial teeth to dental plates.

In addition to the rubber-base compositions, such as the one known in the dental profession as "vulcanite", new compounds have been developed and used for making the dental plates. Whereas "vulcanite" requires a curing temperature of over 300 degrees Fahrenheit, these newer compounds may be cured at temperatures as low as 120 degrees.

It is well known to persons versed in this art that investments made of plaster of Paris which have been subjected to a high curing temperature are much softer and hence more readily trimmed away than investments which have been exposed to a low curing temperature of, say 120 degrees Fahrenheit only.

Therefore, when using the conventional types of flasks for molding plates made of low temperature curing compounds, there is, (because of the greater hardness of the plaster of Paris investment) great danger of breaking the teeth or plates in the process of trimming said investment to remove the dental-case therefrom.

The primary object of this invention is to provide a dental flask, of the sectional type, which is of simple construction and by means of which the anterior part of an investment may be readily exposed.

Another object of this invention is to provide a dental flask having an intermediate section made of two parts, the anterior part of which may be readily removed to expose the front of the investment without having to remove the latter from the posterior part of said intermediate section or from the base of the flask.

Yet another object of this invention is to provide a sectional flask the sections of which are accurately joined together by means of interlocking tongues and grooves of greater length than found in conventional flasks, to thus insure a precision fit for the various sections and proper closing of the flask.

Additional features and advantages of this invention will appear in the following description considered in connection with the accompanying drawing forming part of this application, and in which.

Figure 2:
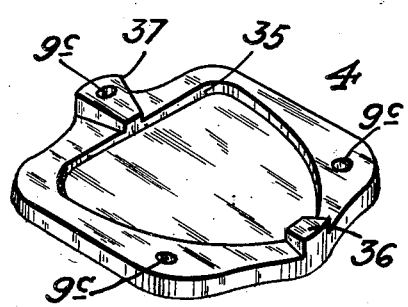
Fig. 2 is a similar view showing a bottom view of the cover of the flask.
Figure 1:
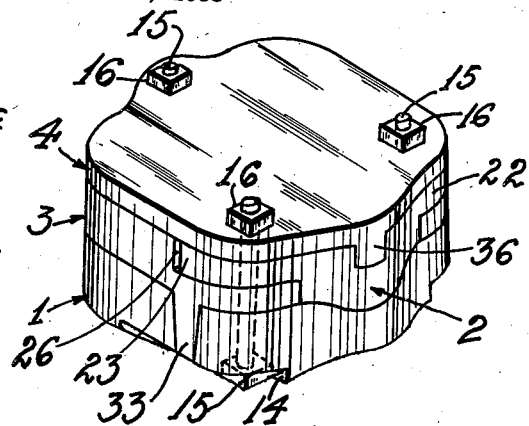
Fig. 1 is a perspective view of an assembled dental flask built in accordance with this invention.

Reference being had to the drawing, the dental flask of my invention comprises in the main the following parts:—the cup-shaped base 1, preferably made shallower than bases used in conventional flasks, the anterior intermediate section 2, the posterior intermediate section 3 and the cover 4.

The base 1 comprises a bottom 5 and the peripheral wall 6, joined thereto by pronounced interior fillets 6ª and having at the right and left hand sides thickened portions 7, 8 in which are provided the bolt-holes 9 and the outwardly flaring grooves 10. The front and rear walls have also gradually thickened portions 11 and 12, and in the latter there is provided a third bolt-hole 9. The sides of the wall having bolt-holes are undercut outwardly at the bottom of the base, as at 13, to provide the stops 14 which prevent the square headed bolts 15 from turning when the bolt-nuts 16 are applied.

The front and rear sides of the peripheral wall have at the top central curved recesses or dips 17, 18 which are preferably made outwardly flaring, to facilitate a proper fit with the intermediate sections 2 and 3. The purpose of these dips is, of course, to effect a greater exposure of the investment, while it is still in the base 1.

Figure 3:
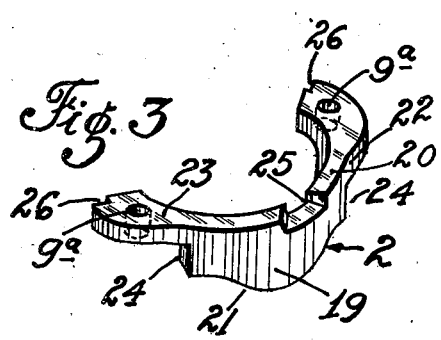
Fig. 3 is a perspective view of the anterior part of the intermediate section of the flask.
Figure 6:
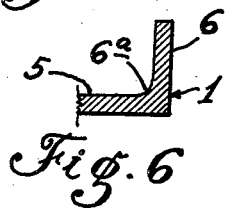
Fig. 6 is a fragmentary sectional view taken substantially on a plane 6—6 in Fig. 5.
Figure 5:
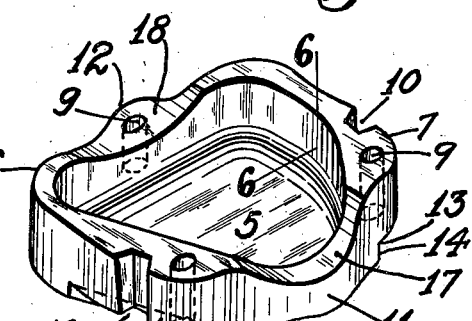
Fig. 5 is a perspective view of the cup-shaped base of the flask.
Figure 4:
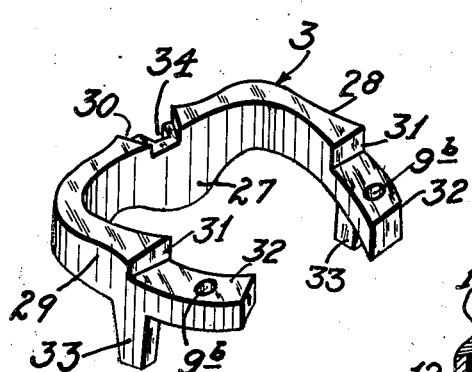
Fig. 4 shows in perspective the posterior part of said intermediate section.
Figure 7:
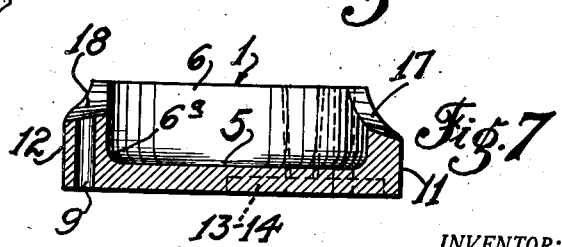
Fig. 7 is a longitudinal section through the base of the flask.

The anterior intermediate section 2 is shaped outwardly and inwardly to conform with the corresponding portion of the base. This section comprises a central apron 19 having a level top 20 and a lower edge 21 curved and tapered to accurately fit within the dip 17. On both sides of the apron are symmetrically disposed the lateral arms 22, 23 which are flush with the top of the apron and partly rabbeted on the underside, as shown at 24. In these arms are the bolt-holes 9ª which register with the holes 9 in the base, and in the top of the apron there is provided a central notch 25 having vertical side-walls and flaring outwardly, as plainly shown in Fig. 3. At the ends of the arms are small recesses 26 extending only a fraction of the width of said arms. The purpose of these recesses is to permit the insertion therein of any desired tool, such as a screw driver, whereby the anterior section 2 may be pried loose laterally and in a purely horizontal direction from the investment, independently of the posterior part of said intermediate section and of the base of the flask.

The posterior intermediate section 3 is also shaped to conform with the rear part of the base and comprises a central apron 27, curved and tapered to register accurately with the dip 18 in the base, and the symmetrically disposed arms 28, 29, flush with the top of the apron. At the top of the latter there is the central notch 30 having vertical walls and flaring outwardly, as shown.

The arms 28, 29 are partly rabbeted at the top, as at 31, to provide the extensions 32 which are overlapped by the arms 22 and 23 of the anterior section 2, so that, when assembled, the arms of both intermediate sections will be level at the top and bottom. Bolt-holes 9ᵇ are also provided in these extensions.

On the underside of the arms 28, 29 there are provided the downwardly directed tapering and long lugs 33, of a thickness substantially equal to the depth of the grooves 10 in the base and fitting accurately therein. The vertical groove 34 in the apron 27 is provided to accommodate the rear bolt 15.

The cover 4 is preferably recessed on the underside, as at 35, and has the keystone shaped depending lugs 36 and 37 fitting snugly in their respective notches 25 and 30 provided in the intermediate sections 2 and 3. Bolt-holes 9ᶜ are also provided.

From the foregoing description it will be noted that, after the removal of the bolts 15 and the cover 4, the anterior intermediate section may be pried off laterally and in a purely horizontal direction, by means of a screw-driver for instance, and that the liberation of said section does not require prying in a vertical direction, which act would subject the investment to excessive strains capable of cracking the embedded dental-case. The removal of said anterior part permits the trimming away of the investment on the labial side of the case by frontal attack, instead of effecting said trimming by digging from above, as is necessary with conventional flasks having a one-piece intermediate section.

Since the anterior teeth on the plate are the thinnest and, therefore, most easily broken, the frontal trimming of the investment will practically eliminate breakage of the teeth or plate, because of the greater visibility and accessibility obtained.

The clamping bolts 15 may be dispensed with when suitable presses or clamps are available to hold down the component parts of the flask, the interengaging lugs and notches being sufficient to insure a correct fit between said parts during the curing process.

While I have illustrated and described herein the preferred embodiment of my invention, it may be found desirable after continued experience to make slight changes in the construction and arrangement of the details of my invention, and I intend to include in this application all such variations as fall within the scope of the appended claims.

I claim:

1. In a dental flask, a cup-shaped base having at the top of its peripheral wall a front and rear outwardly flaring depression; a cover; a front intermediate section comprising a central apron having a level top and an arcuate flaring bottom adapted to fit in said front depression; lateral arms disposed symmetrically and integral with said apron, flush with the top thereof and level at the bottom; a rear intermediate section comprising a central apron having a level top and an arcuate flaring bottom adapted to fit in said rear depression, lateral arms disposed symmetrically and integral with said apron, flush with the top thereof and level at the bottom; the arms of said intermediate sections being partly rabbeted and disposed in partly overlapping relation; interengaging means provided in said cover, intermediate sections and base to hold said flask in assembled condition; the arms of said front intermediate section being partly recessed outwardly at the ends to permit the insertions of means whereby said section may be removed laterally and in a purely horizontal direction independently of said rear intermediate section and base.

2. In a dental flask, a cup-shaped base having a wall increasing gradually in thickness toward the front and rear and having thereat outwardly flaring depressions; a cover; a front intermediate section comprising a central apron of gradually increasing thickness toward the center thereof and having a level top and an arcuate flaring bottom adapted to fit in said front depression; lateral arms disposed symmetrically and integral with said apron, flush with the top thereof and level at the bottom; a rear intermediate section comprising a central apron also of gradually increasing thickness and having a level top and an arcuate flaring bottom adapted to fit in the rear depression, lateral arms disposed symmetrically and integral with said apron, flush with the top thereof and level at the bottom; the arms of said intermediate sections being partly rabbeted and disposed in partly overlapping relation; interengaging means provided in said cover, intermediate sections and base to hold said flask in assembled condition; the arms of said front intermediate section being partly recessed outwardly at the ends to permit the insertion of means whereby said section may be removed laterally and in a horizontal direction independently of said rear intermediate section and base.

OTTO C. MALSCH.